April 27, 1937.  E. SEIBOLD  2,078,738
HYDRAULIC COUPLING OR TORQUE CHANGER, FILLING, AND EMPTYING MEANS
Original Filed Sept. 9, 1933
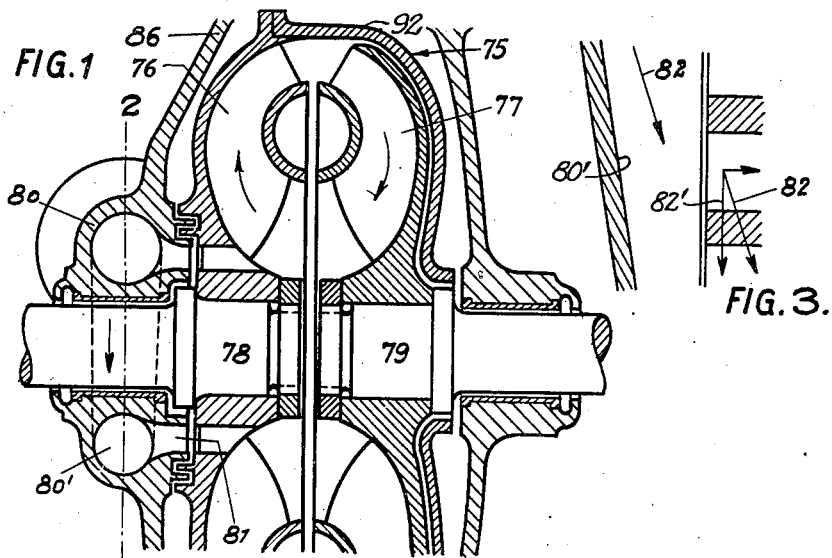
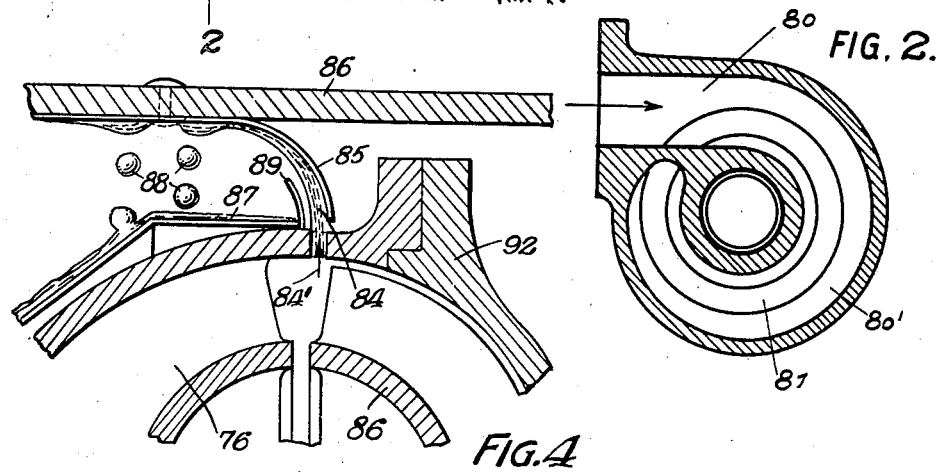
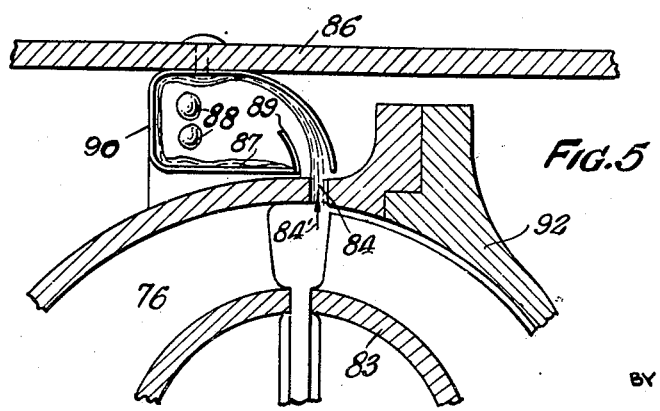
INVENTOR
ERNST SEIBOLD
BY C. P. Goepel
ATTORNEY.

Patented Apr. 27, 1937

2,078,738

UNITED STATES PATENT OFFICE 2,078,738

HYDRAULIC COUPLING OR TORQUE CHANGER, FILLING, AND EMPTYING MEANS

Ernst Seibold, Heidenheim-on-the-Brenz, Germany, assignor to J. M. Voith, Heidenheim-on-the-Brenz, Germany, a copartnership composed of Walther Voith, Hermann Voith, and Hanns Voith Original application September 9, 1933, Serial No. 688,727. Divided and this application May 23, 1934, Serial No. 727,164. In Germany September 10, 1932

4 Claims. (Cl. 60—54)

My present invention relates to new and useful improvements in hydraulic couplings, hydraulic variable speed transmissions or similar devices, and more particularly to means for filling and emptying the same.

The application of devices such as well known hydraulic transmissions based on the principle of circulating liquids has heretofore been fundamentally limited due to the fact that they yield good efficiencies only over a comparatively small speed range of the driven shaft. In many instances, however, it is essential that the primary power be fully available over as great as possible a speed range of the secondary drive shaft.

On the other hand, hydraulic transmission possesses advantages in regard to simplicity in operating the same, in wear, safety of operation, weight and cost. The advantages, however, cannot be realized so long as there is no hydraulic transmission which will satisfy the requirement as to efficiency.

In accordance with my invention, U. S. Patent application Serial No. 688,727, filed September 9, 1933, of which the present application is a division, the problem is solved in the most simple manner and with entire safety in operation, through the provision of the several completely self-contained hydraulic transmissions or torque changers, each having a different transmission ratio, and so combined and operated that at all times the particular transmission which will most efficiently take care of the torque required is available for selection and operation. The process of changing from one transmission device to another is effected simply by draining the working liquid from the device in operation and concurrently filling the one which will give the desired torque ratio. Pursuant to the principle of my invention, the change from one transmission device to another may be accomplished without affecting the torque on the driven shaft.

The filling and emptying means to be covered through this invention can be broadly used with any individual hydraulic coupling or torque changer, or similar device, whereby it is absolutely not necessary that these parts form elements of a hydraulic variable speed transmission.

Among the objects of this invention are the following: to provide means for the proper admission of working liquid to the rotating parts of the mentioned couplings, torque changers, hydraulic variable speed transmissions or similar devices and, under certain conditions, to effect the filling operation in the shortest possible time; and further to provide for the discharge of such liquid from the rotating parts in a shock-free manner, and in such a way that the liquid will be promptly drained away from the rotating parts in a manner that will preclude its contact therewith again, whereby to avoid waste of energy.

Other objects, and the manner in which they may be attained, will appear from the following description.

The devices heretofore used for the purpose lack efficiency inasmuch as in most cases the flow velocity in the intake pipe is reduced or effectively destroyed in an annular chamber near the axis of the rotating transmission, due to the cross currents produced in the chamber, thereby making it difficult for the liquid to flow from the stationary intake pipe into the rotating wheels. With the present improvements, these drawbacks are overcome by providing at the end of the intake pipe a spiral similar to those used with hydraulic turbines. Therefore, intake spiral means a spiral shaped conduit through which the working liquid has to pass before entering the rotating elements. This spiral is arranged so that the operating liquid can enter the rotating parts equally distributed around the shaft, and therefore the flow velocity existing in the intake pipe is transformed into rotational velocity in a stream with strictly parallel paths so that an almost loss-free transmission of the liquid from the stationary intake spiral into the rotating parts is attained.

Furthermore in the employment of hydraulic transmissions or couplings of the class which are put in operation by filling the same with liquid and which are taken out of operation by draining the liquid therefrom, it is under certain conditions necessary to effect the filling operation in the shortest possible time. It will be appreciated that the filling time will be shortened proportionately to the amount of liquid that can be admitted in the transmission per second.

According to the characteristic feature of my invention, means are provided to obtain shock-free drawing of the working liquid from a hydraulic flow coupling, a hydraulic flow transmission or a similar device.

Furthermore, in the use of hydraulic flow couplings or transmissions it is in many instances desirable to provide for the outward discharge of the working liquid from the rotating parts during their operation. If for any reason, as for instance if such a coupling is applied to an automotive vehicle, the housing around the coupling must be kept small in diameter, there is danger that the discharged liquid will repeatedly get in contact with the rotating elements of the coupling, whereby much energy is wasted. Tests have shown that these losses are liable to increase to such an amount that the application of the coupling or transmission becomes uneconomical.

These difficulties are avoided by my present improvements which provide for the discharge of the liquid from the rotating parts into stationary elements in such a way that the liquid will be carried away from the rotating parts with no chance of getting in contact with the same again. This result is obtained according to my improvements by providing a stationary housing around the coupling or transmission for carrying away the discharged liquid without shock. Usually the rotating wheels of hydraulic flow couplings or hydraulic flow transmissions are provided with discharge holes at their outer circumference. Through these holes the liquid is discharged in rotating jets in a plane perpendicular to the axis of rotation. If in the immediate vicinity of the rotating parts a stationary element is arranged having a smoothly bent guiding wall which, near the discharge opening, adapts itself as closely as possible to the direction of the discharge jets, then the latter will be deflected by the said wall shock-free and carried from the discharge plane. It is desirable to make the stationary housing around the coupling or transmission of such form and extent that the liquid jets running along the deflecting wall will lose their energy by friction and consequently drop from the deflecting wall to the inner wall of the housing by gravity. In order to prevent the discharged liquid from falling back on the coupling where it will absorb more energy, the inner wall of the stationary housing may be provided with an additional wall parallel to the deflecting wall.

With the foregoing and other objects in view, the invention consists in the construction and arrangement of parts so combined as to coact and cooperate with each other in the performance of the functions and the accomplishment of the results herein contemplated, and comprises in its evolvement the simple and practical examples illustrated in the accompanying drawing, wherein:—

Figure 1 is a vertical sectional view of a hydraulic coupling with spiral for the admission of liquid;

Fig. 2 is a cross section through the intake spiral, taken on the line 2—2 of Fig. 1;

Fig. 3 is a sectional diagram indicative of the velocities obtained for the working liquid entering the wheel from the spiral;

Fig. 4 is a sectional view diagrammatically illustrating the stationary housing for carrying liquid away from a transmission device; and Fig. 5 is a similar view, but showing an arrangement by means of which the liquid is drained along the circumference of the rotating parts.

Referring to the example shown in Fig. 1, 75 denotes in general a hydraulic coupling the primary and secondary wheels 76 and 77 of which are represented as attached respectively to the driving and driven shafts 78 and 79. The primary wheel or impeller 76 is provided with a rotary casing 92 which encloses the secondary wheel 77. 80 denotes the stationary intake pipe for the working liquid and this pipe is characterized by the fact that its delivery end or portion 80' is made in the form of a spiral of the type used for intake spirals of hydraulic turbines. Due to the spiral portion, the working fluid is caused to enter the wheel of the hydraulic apparatus equally distributed over the annulus 81 and in such manner as to have approximately the same rotational velocity as the rotating parts. The velocities given to the liquid entering the coupling from the spiral are indicated by the arrows 82 and 82' in the section of diagram of Fig. 3.

Examples of the constructional means whereby the desired results in discharging the liquid from the coupling may be attained are shown in the fragmentary sectional illustrations of Figs. 4 and 5, wherein the wall of the rotating coupling or impeller 76 is represented as being provided at its circumference with a discharge bore 84 (of which in practice there are a number of such bores equally spaced from each other). From these bores jets of liquid are discharged in the direction indicated by the arrows 84'. These jets are deflected by a wall 85 provided on the stationary housing 86 and eventually fall on a wall 87 as drops 88. The wall 87 embraces the coupling as closely as possible and its end 89 is bent parallel to the deflecting wall 85.

In the form shown in Fig. 4, the liquid caught by wall 87 is drained towards the shaft of the coupling, whereas in the form shown in Fig. 5, the liquid is reclaimed by wall 90 and consequently drained along the circumference. These devices carry the liquid to the liquid pump and fulfill the task of preventing the liquid from getting in contact with the rotating elements of the coupling once it has been discharged from the same.

While my improvements have been illustrated and described with some degree of particularity, it is realized that in practice various changes and alterations may be made in the same, and further that the improvements are capable of embodiment in many different constructions. It has been sought herein to illustrate only such embodiments as will suffice to exhibit the character of the improvements. Reservation is, therefore, made to the right and privilege of changing the form of the details of construction as herein presented or otherwise altering the arrangement of the parts without departing from the spirit or scope of the improvements or the scope of the appended claims.

I claim:

1. A hydraulic apparatus comprising a stationary casing, rotary means including an impeller, a driven wheel and a rotary casing secured to one of them and enclosing the other arranged in said stationary casing, means for delivering the working fluid to the rotary parts arranged in said stationary casing, said delivering means being adapted to impart a rotary motion to the working fluid, circumferential means for discharging the fluid from the rotary parts and means comprising a guide member adapted to prevent the discharged fluid from again coming in contact with the rotary parts.

2. A hydraulic apparatus comprising a stationary casing, rotary means including an impeller, a driven wheel and a rotary casing secured to one of them and enclosing the other arranged in said stationary casing, an intake spiral for delivering the working fluid to the rotary parts, said intake being adapted to impart a rotary motion to the working fluid before it enters the rotary parts, circumferential openings for discharging the fluid from the rotary parts and a guide member adapted to prevent the discharged fluid from again coming in contact with the rotary parts.

3. A hydraulic apparatus comprising a stationary casing, rotary means including an impeller, a driven wheel and a rotary casing secured to one of them and enclosing the other arranged in said stationary casing, an intake spiral having tapering shape for imparting rotary motion to the working fluid and delivering the same to the rotary parts equally distributed over their entire circumference, and at a speed approaching the speed of said rotary parts, circumferential openings for discharging the fluid from the rotary parts and a guide member coacting with said openings for preventing the discharged fluid from again coming in contact with the rotary parts.

4. A hydraulic apparatus comprising a stationary casing, rotary means including an impeller, a driven wheel and a rotary casing secured to one of them and enclosing the other arranged in said stationary casing, means for delivering the working fluid to the rotary parts arranged in said stationary casing, said delivery means being adapted to impart a rotary motion to the working fluid, circumferential means for discharging the fluid from the rotary parts and guide means arranged in said stationary casing to prevent the discharged fluid from again coming in contact with the rotary parts, said guide means comprising two parallel curved walls, one of said walls serving to deflect the discharged fluid and the other serving to prevent return of fluid so deflected.

ERNST SEIBOLD.